(12) United States Patent
Bachmaier et al.

(10) Patent No.: US 9,306,485 B2
(45) Date of Patent: Apr. 5, 2016

(54) SUPPLY LINE, SUPPLY SYSTEM AND METHOD FOR OPERATING AN ELECTRIC DRIVE

(71) Applicant: Siemens Aktiengesellschaft, München (DE)

(72) Inventors: Georg Bachmaier, München (DE); Christian Bachmann, München (DE); Dominik Bergmann, Sachsenkam (DE); Matthias Gerlich, München (DE); Andreas Gödecke, München (DE); Guillaume Pais, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 349 days.

(21) Appl. No.: 13/874,957

(22) Filed: May 1, 2013

(65) Prior Publication Data

US 2013/0293168 A1    Nov. 7, 2013

(30) Foreign Application Priority Data

May 2, 2012    (DE) .......................... 10 2012 207 263

(51) Int. Cl.
| | |
|---|---|
| *H02P 6/00* | (2006.01) |
| *H02P 6/14* | (2006.01) |
| *H02P 23/04* | (2006.01) |
| *H02P 27/06* | (2006.01) |

(Continued)

(52) U.S. Cl.
CPC ................. *H02P 23/04* (2013.01); *B60L 3/003* (2013.01); *B60L 11/1803* (2013.01); *H02M 1/15* (2013.01); *H02P 27/06* (2013.01); *B60L 2220/42* (2013.01); *H02P 5/74* (2013.01); *Y02T 10/648* (2013.01); *Y02T 10/7005* (2013.01)

(58) Field of Classification Search
CPC .................................. H02P 23/04; H02P 5/74
USPC ....................................... 318/400.01, 400.24
See application file for complete search history.

(56) References Cited

U.S. PATENT DOCUMENTS 5,452,698 A  *  9/1995  Denz et al. ............... 123/406.24
6,020,714 A       2/2000  Ehrler et al.

(Continued)

FOREIGN PATENT DOCUMENTS

| DE | 19727507 A1 | 1/1999 |
|---|---|---|
| DE | 69609562 T2 | 4/2001 |

(Continued)

*Primary Examiner* — Bentsu Ro
*Assistant Examiner* — Gabriel Agared
(74) *Attorney, Agent, or Firm* — Henry M Feiereisen LLC

(57) ABSTRACT

An electrical supply line for operating a first electric motor includes a first converter for supplying electric energy to the first electric motor in dependence of a first control variable, a connected network connecting the first converter to a DC voltage source, an oscillation suppression controller for generating first correction information, and a first correction module for generating the first control variable by taking into consideration an operating parameter of the first electric motor and by taking into consideration the first correction information. An electrical supply system includes two of the supply lines. A corresponding method for operating an electric drive is also described.

10 Claims, 4 Drawing Sheets

(51) Int. Cl.
*H02M 1/15* (2006.01)
*B60L 3/00* (2006.01)
*B60L 11/18* (2006.01)
*H02P 5/74* (2006.01)

(56) References Cited

U.S. PATENT DOCUMENTS

| | | |
|---|---|---|
| 7,150,254 B2 | 12/2006 | Ichimoto et al. |
| 2004/0120172 A1* | 6/2004 | Heikkila et al. ............ 363/132 |
| 2006/0222910 A1* | 10/2006 | Aoyagi et al. ................ 429/12 |
| 2009/0250279 A1* | 10/2009 | Holmes ................... 180/65.285 |
| 2011/0013429 A1* | 1/2011 | Campbell et al. .............. 363/40 |
| 2011/0221375 A1 | 9/2011 | Suzuki |
| 2011/0273914 A1 | 11/2011 | Kim |
| 2012/0061169 A1* | 3/2012 | Oblizajek et al. ............. 180/446 |
| 2014/0195137 A1* | 7/2014 | Fischer ........................ 701/110 |

FOREIGN PATENT DOCUMENTS

| | | |
|---|---|---|
| DE | 102005018065 A1 | 12/2005 |
| EP | 0097958 A2 | 1/1984 |

* cited by examiner

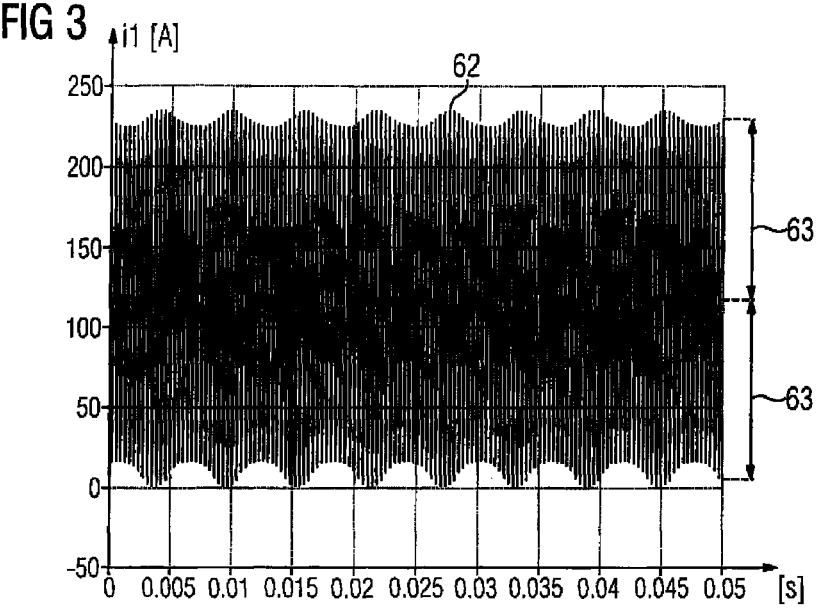
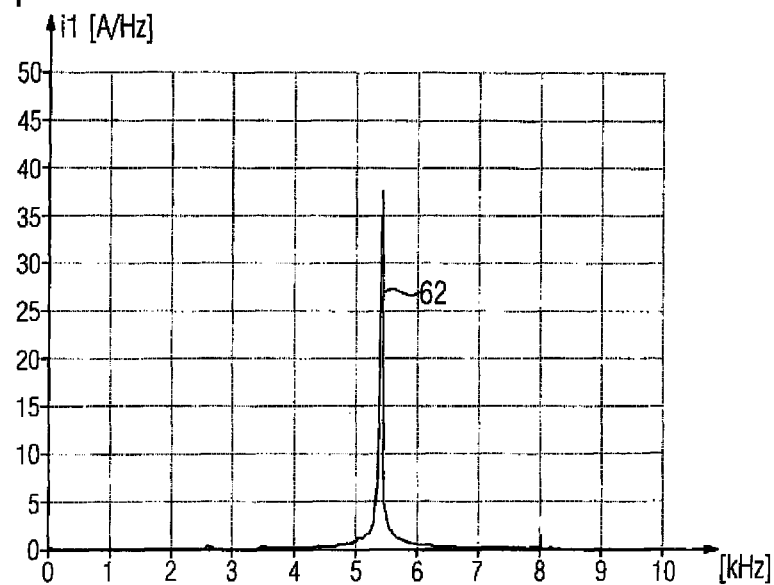

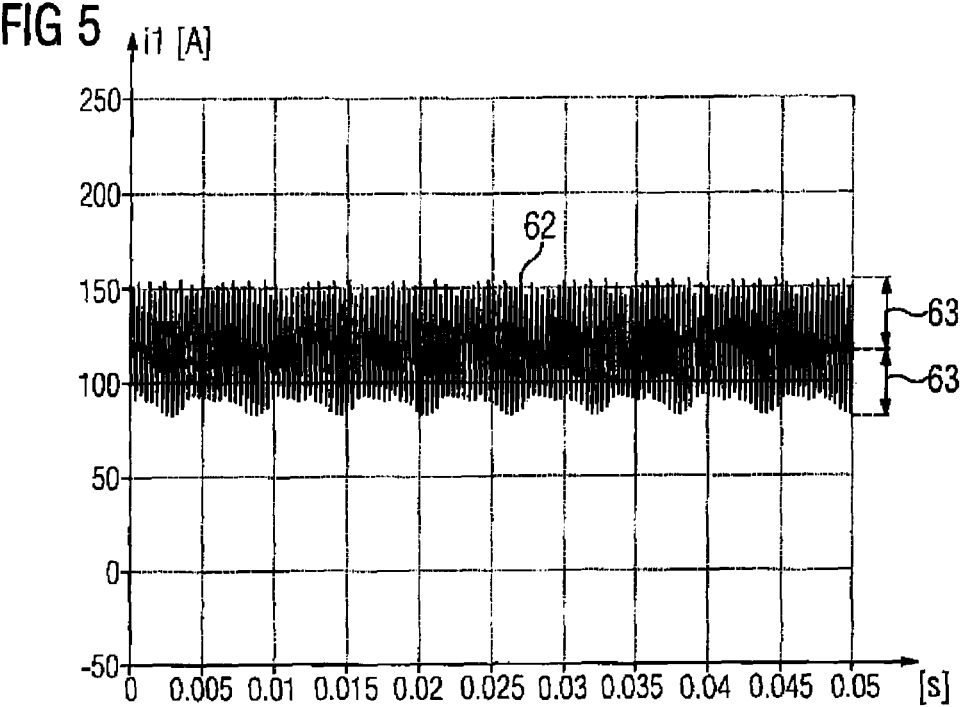
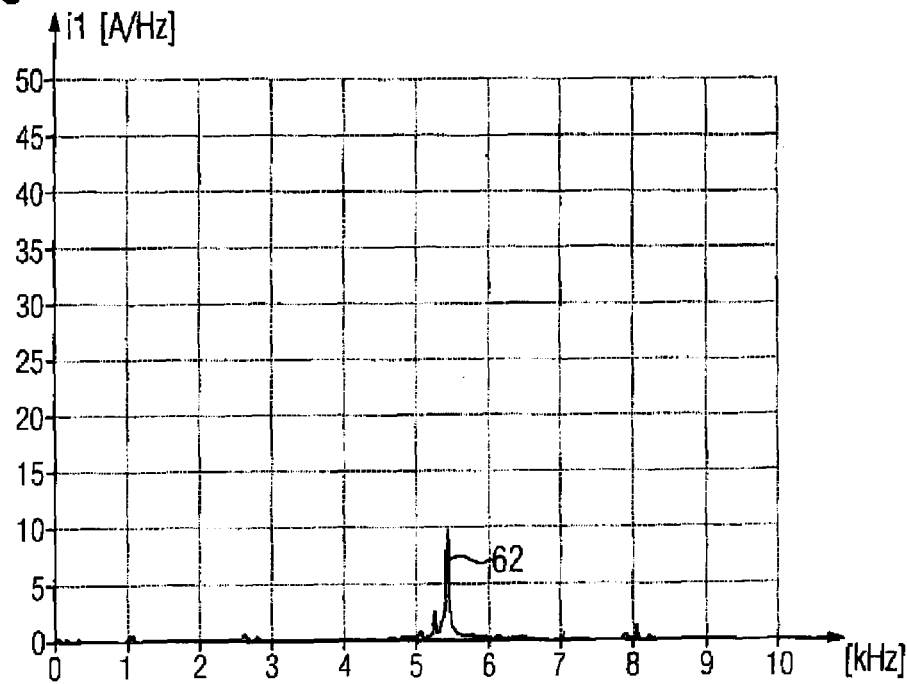

SUPPLY LINE, SUPPLY SYSTEM AND METHOD FOR OPERATING AN ELECTRIC DRIVE

CROSS-REFERENCES TO RELATED APPLICATIONS

This application claims the priority of German Patent Application, Serial No. 10 2012 207 263.2, filed May 2, 2012, pursuant to 35 U.S.C. 119(a)-(d), the content of which is incorporated herein by reference in its entirety as when fully set forth herein.

BACKGROUND OF THE INVENTION

The present invention relates to an electrical supply line for operating an electric motor, and to an electrical supply system with an electrical supply line for operating an electric motor. The present invention also relates to a method for operating an electric drive.

The following discussion of related art is provided to assist the reader in understanding the advantages of the invention, and is not to be construed as an admission that this related art is prior art to this invention.

Two electric motors, which are driven by way of an inverter respectively, are typically operated in electric vehicles. The two inverters are powered by way of a shared connection network from a shared voltage source. In conjunction with inductances in the connection network and capacitances of the inverters on the input side, an increased tendency to unwanted high-frequency oscillations is observed in the connection network, namely in particular when an operating electric motor is connected to each of the two inverters.

The tendency to oscillate was previously suppressed by the choice of electrolytic capacitors as inverter capacitance. The higher internal resistance of electrolyte capacitors suppresses oscillations. It is also known to attenuate high frequencies by means of ferrite rings. However the internal resistance of electrolyte capacitors and the oscillation-attenuating effect of the ferrite rings results in a conversion of electric energy into thermal energy, in other words into unwanted electrical losses and unwanted thermal stress on the components.

It would therefore be desirable and advantageous to obviate prior art shortcomings and to provide improved and more effective suppression of oscillations without increasing electrical losses.

SUMMARY OF THE INVENTION

According to one aspect of the present invention, an electrical supply line for operating a first electric motor includes a first converter for supplying the first electric motor with electric energy as a function of a first variable; and a connection network, which connects the first converter to a DC voltage source. The supply line includes an oscillation suppression controller for generating correction information and a first correction module for generating the variable taking into account an operating parameter of the first electric motor and also the first correction information.

According to another aspect of the present invention, an electrical supply system includes a first inventive supply line and a second inventive supply line.

According to yet another aspect of the present invention, a method for operating an electric drive includes:
supplying electric energy from a DC voltage source to a first converter via a connection network;
generating first correction information taking into account a voltage applied to the first converter via a connection network and/or a current supplied to the first converter via the connection network;
generating a control variable taking into account an operating parameter of a first electric motor and the first correction information; and
supplying electric energy from the first converter to an electric motor connected to the first converter as a function of a first control variable.

By generating correction information by taking into consideration a voltage supplied to a converter via a connected network and/or by taking into consideration a current supplied to the converter via the connected network and by generating a control variable for the converter by taking into consideration the correction information, the oscillation suppression controller is able to detect the occurrence of an oscillation and to counteract a further increase of the oscillation.

According to an advantageous feature of the present invention, the supply line may include a first motor controller for controlling the first electric motor, which is configured to generate the first operating parameter. A driving behavior of the first electric motor can then be affected in known manner.

According to another advantageous feature of the present invention, the first operating parameter may include a space phasor. The operation of the motor controller can then be maintained in a known and proven manner.

According to another advantageous feature of the present invention, the first control variable may include a space phasor. The operation of the first converter can then be affected in a known and proven manner.

According to another advantageous feature of the present invention, the supply system may include a shared oscillation suppression controller for generating the correction information for the control variables of the first and second supply line. The manufacturing expense for the hardware of a second oscillation suppression controller can thus be eliminated.

According to another advantageous feature of the present invention, the shared oscillation suppression controller may be configured to generate the correction information for the control variable of the first supply line by taking into consideration a voltage applied to the converter of the second supply line via the connected network and/or in dependence of a current supplied to the converter of the second supply line via the connected network. In this way, oscillation suppression for the first supply line can be coordinated with oscillation suppression for the second supply line, thus eliminating the creation of an oscillation due to a lack of internal coordination between the oscillation suppression controls for the two supply lines.

According to another advantageous feature of the present invention, the shared oscillation suppression controller may be configured to generate the correction information for the control variable of the second supply line by taking into consideration the voltage applied to the converter of the first supply line via the connected network and/or in response to a current supplied to the converter of the first supply line on the connected network. In this way, oscillation suppression for the first supply line can likewise be coordinated with oscillation suppression for the second supply line, thereby eliminating the creation of an oscillation due to a lack of internal coordination between the oscillation suppression controls for the two supply lines.

According to another advantageous feature of the present invention, the electrical supply line or the electrical supply system may include the first and/or the second electric motor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a timing diagram of a current through a DC power cable of a first inverter of the electric power system without employing the oscillation suppression system according to the invention, FIG. 4 shows a timing diagram of a current through a DC power cable of the first inverter of the electric power system with the oscillation suppression system according to the invention, FIG. 5 shows a frequency spectrum of a current of the AC component through a DC power cable of the first converter of the electric power system without employing the oscillation suppression system according to the invention, FIG. 6 shows a frequency spectrum of a current of the AC component through a DC power cable of the first converter of the electric power system with the oscillation suppression system according to the invention.

DETAILED DESCRIPTION OF PREFERRED EMBODIMENTS

Figure 1:
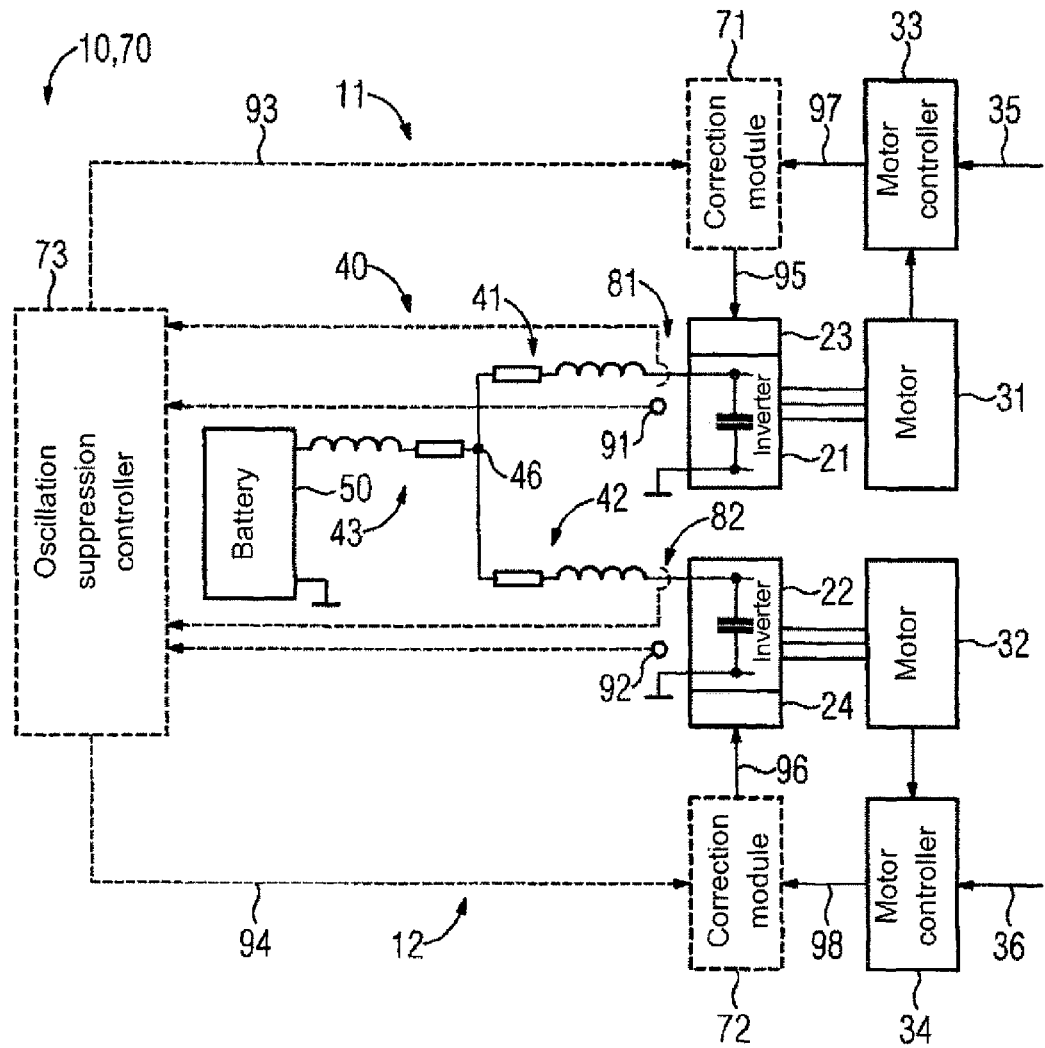
FIG. 1 shows a schematic block diagram of an electrical supply system for two electric motors.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an electrical supply system 10 with two supply lines 11, 12. The first supply line 11 includes a first converter 21 for driving a first three-phase electric motor 31. The first inverter 21 is connected on the DC side via a connected network 40 to a battery 50 (DC voltage source). Alternatively or in addition, the first AC motor 31 can be configured for operating as a generator, where in energy flows from the electric motor 31 to the battery 50. The first inverter 21 and the first electric motor 31 may also be configured to operate with more than three phases.

An inverter capacitance C1 is disposed on the DC side 24 of the first converter 21. The inverter has a capacitance C1 has typically a capacitance value in the range of, for example, 600 pF. The capacitance C1 is preferably a film capacitor with a low internal resistance. The connected network 40 includes at least a first line 41 with a parasitic line inductance L1 and a parasitic ohmic line resistance R1. The parasitic line inductance L1 has typically an inductance value in the range of, for example, 1.5 μH.

The electrical supply system 10 includes a second supply line 12, which may have the same structure as the first supply line 11.

Figure 2:
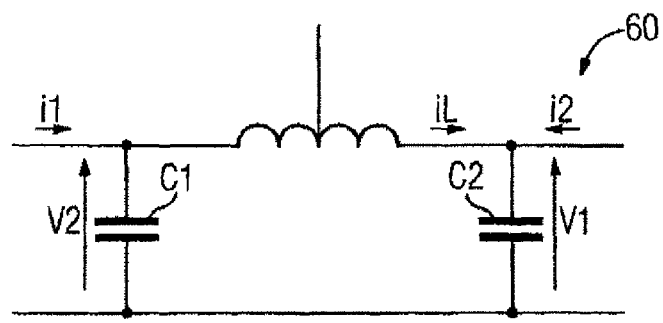
FIG. 2 shows a schematic equivalent circuit diagram of an oscillatory quadrupole formed by the inverter capacitances of inverters and a connected network between the two inverters.

The DC current between the battery 50 and the converters 21, 22 flows largely through a shared connection line 43. The shared lead 43 may be entirely or largely composed of a wiring inside the battery 50. The potential of tap 46 is not defined due the shared connection line 43. Typically, the parasitic inductance L3 of the shared connection line 43 is proportionally significantly greater than the parasitic inductances L1, L2 of the connection lines 41, 42 of the inverters 21, 22. The AC component is hence typically concentrated in the connection lines 41, 42 of the inverters 21, 22. It is then sufficient for a coarse analysis of the oscillation characteristics to consider only the cross current iL and to mentally combine the parasitic inductances L1, L2 of the connection lines 41, 42 in the equivalent circuit 60 (see FIG. 2) to a shared inductance L=L1+L2. When the tap 46 to the battery 50 is not considered for an AC analysis, the connected network 40 together with the two converter capacitances C1, C2 may be regarded as an oscillatory quadrupole in the form of a Pi-circuit 60 (see FIG. 2).

FIG. 3 shows in the time domain and FIG. 4 shows in the frequency domain the pronounced electrical oscillations 62 formed in the connected network 40, when a respective electric motor 31, 32 is operated on each of the inverters 21, 22. In the illustrated example, the resonant frequency of the connected network 40, including the converter capacitances C1, C2 (i.e. the equivalent circuit 60), is 5.3 kHz, and the frequency of pulse-width-modulation is 8 kHz. The proximity of this frequency to the natural frequency of the connected network 40 causes excitation of the connected network 40.

These electrical oscillations 62 are undesirable. As a result of the electric oscillations 62, the currents i1, i2 in the lines 41, 42 are higher and additional ohmic losses occur in the lines 41, 42 and the converter capacitances C1, C2, which cause additional conversion of electric energy into thermal energy. Due to the additional AC current and the additional heat generation, the electric components 41, 42, C1, C2 are stressed more. To prevent accelerated aging and more likely failures, the components 41, 42, C1, C2 must be oversized, which increases manufacturing costs and weight of the power supply system.

To attenuate the oscillations 62, the supply system shown in FIG. 1 includes an oscillation suppression system 70. The oscillation suppression system 70 includes an oscillation suppression controller 73, a first correction module 71, a first current sensor 81, and a first voltage sensor 91. To effectively suppress the high-frequency oscillations, the oscillation suppression controller 73 preferably performs particularly fast signal processing. To satisfy the sampling theorem, the oscillation suppression controller 73 should perform per second at least twice as many passes through the processing loop as the frequency of the pulse-width-modulation. This corresponds to at least 16,000 complete passes through the processing loop with a pulse-width-modulation of 8 kHz.

The first current sensor 81 and the first voltage sensor 91 are arranged on the connection line 41 of the first converter 21. The oscillation suppression controller 73 determines with the first voltage sensor 91 and the first current sensor 81 a phase and an amplitude 63 of an oscillation state 62 of the connecting line 41 of the first inverter 21. The oscillation suppression controller 73 then determines from the phase and the amplitude 63 of the oscillation state 62 a first correction information 93 for a control variable 95 of the first inverter 21. The first correction module 71 generates the first control variable 95 for controlling an intensity of an energy flow between the battery 50 and the first inverter 21.

A low-frequency component of the first control variable 95 is preferably mostly determined by a first raw signal 97 of the control variable 95, which receives the first correction module 71 from the first motor controller 33. The first motor controller 33 receives the corresponding required operating parameters from the first motor 31 and optionally from an externally supplied first command variable 35. A higher frequency portion of the first control variable 95 is preferably mostly determined by the first correction information 93 which the first correction module 71 receives from the oscillation suppression controller 73. The higher-frequency component (the correction information 93) of the first control variable 95 may be a space phasor which is added by vector addition to a low-frequency raw control variable 97 (which may also be a space phasor).

The first raw signal 97 of the control variable 95, the first control variable 95 and/or the first correction information 93 preferably each include a corresponding space phasor. Preferably, the first control variable 95 causes via a first converter controller 23 a pulse-width-modulation of the first inverter 21.

When a second supply line 12 is present, the oscillation suppression system 70 further includes a second correction module 72 and a second voltage sensor 92 which is arranged on a connection line 42 of the second converter 22. The oscillation suppression system 70 determines with the second voltage sensor 92 and the first current sensor 81 (and/or an optional second current sensor 82) a phase and an amplitude 63 of an oscillation state 62 of the connecting line 42 of the second inverter 12. The oscillation suppression controller 73 calculates from the phase and amplitude 63 of the oscillation state 62 a second correction information 94 for a control variable 96 of the second inverter 22. The second correction module 72 generates the second control variable 96 for controlling an intensity of an energy flow between the battery 50 and the second inverter 22. A low-frequency component of the second control variable 96 is preferably mostly determined by a second raw signal 98 of the control variable, which the second correction module 72 receives from the second motor controller 34. The second motor controller 34 receives the required operating parameters from the second motor 32 and optionally from an externally supplied second command variable 36. A higher-frequency component of the second control variable 96 is preferably mostly determined by the second correction information 94 which includes the second correction module 72 of the oscillation suppression controller 73.

The first raw signal 98 of the control variable 97, the first control variable 97 and/or the first correction information 94 preferably each include a corresponding space phasor. Preferably, the first control variable 96 causes via a second converter controller 24 a pulse-width-modulation of the second inverter 22.

FIG. 5 illustrates in the time domain and in FIG. 6 in the frequency domain the magnitude of the electrical oscillations when the supply system 10 is operated with the oscillation suppression system 70 under otherwise identical conditions as in FIG. 3 and FIG. 4. In the illustrated exemplary embodiment, the oscillation amplitude 63 was reduced with the oscillation suppression system 70 by a factor between 3 and 4. The simulations were performed using MATLAB®/Simulink® in conjunction with the Simpower system library for power electronics components.

According to another improvement, the correction information 93, 94 may be generated with a state space control.

According to one embodiment, the currents form an input vector U=(i1, i2). The voltages v1, v2 and the cross current iL may form a state vector X=(v1, iL, v2), and an output vector Y, respectively. The state vector X and the output vector Y may be identical (Y=X).

The state matrix A may be as follows:
(0, −1/C1, 0; 1/L, 0, −1/L; 0, 1/C2, 0).

The input matrix B may be as follows:
(1/C1, 0; 0, 0; 0, 1/C2).

The output matrix C may be as follows:
(1, 0, 0; 0, 1, 0; 0, 0, 1).

In addition, the following relationship may hold: dX/dt=A*X+B*U, and Y=C*X.

The correction information 93, 94 may be calculated using an LQR algorithm.

The correction information 93, 94 may be correction current values calculated from −K*Y, wherein K is an amplification matrix and an amplification system with its own system characteristic. The amplification matrix K may be applied in the oscillation suppression controller 73 and/or in the correction modules 71, 72.

Preferably, the oscillation suppression system 70 does not affect the conventional control (or regulation) of the converters 21, 22 by the motor controllers 31, 32. For this purpose, a high-pass filter (not shown in the figures) may be provided for each supply line 11, 12 in the oscillation suppression controller 73 and/or in the correction modules 71 forming the correction information 93, 94. Since the motor controls 31, 32 operate at frequencies below 1000 Hz, a cutoff frequency of the high-pass filter may, for example, be about 1000 Hz.

Figure 7:
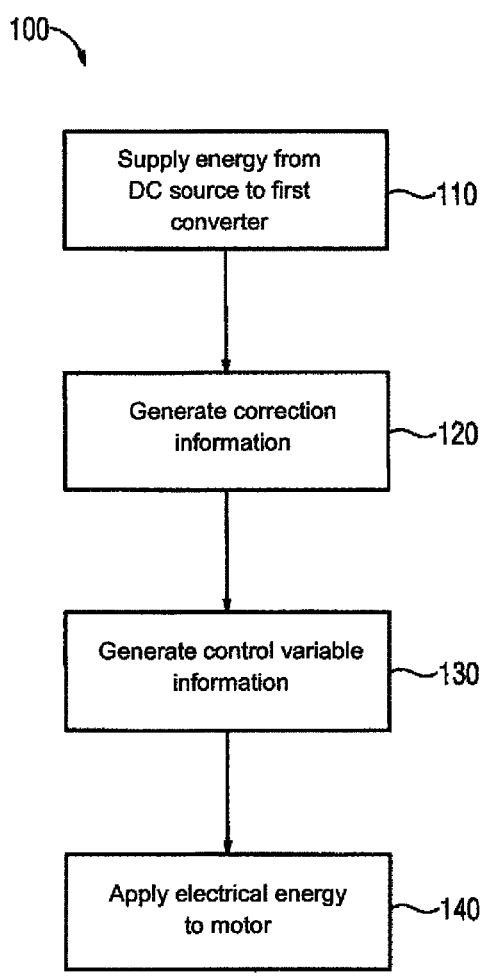
FIG. 7 shows, schematically, a flowchart of an inventive method for operating an electric drive.

FIG. 7 shows schematically a flowchart of a method according to the present invention for operating an electric drive. At a first step 110, electric energy from a DC voltage source 50 is supplied to a first converter 21 via a connected network 40. At a second step 120, first correction information 93 is generated by taking into consideration a voltage (v1) applied to the first converter 21 via the connected network 40 and/or by taking into consideration a current (i1) supplied to the first converter 21 via the connected network 40. Thereafter, at a third step 130, a control variable 95 is generated by taking into consideration an operating parameter 97 of a first electric motor 31 and by taking into consideration the first correction information 93. At step 140, electrical energy from the first converter 21 is supplied to an electric motor 31 connected to the first converter 11 with in dependence of the first control variable 95.

With the proposed supply line, the proposed supply system and the proposed method for operating an electric drive, oscillations that occur when two converters are operated on a shared battery without passive attenuation measures, such as ferrites or resistors, can be reduced. This eliminates cost and weight disadvantages associated with the use of resistors or ferrites. The oscillation suppression system has a modular structure, so that it can be designed as a retrofit option.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electrical supply line for operating a first electric motor, the supply line comprising:
   a first converter for supplying electric energy to the first electric motor depending on a first control variable;
   a connected network connecting the first converter to a DC voltage source;
   an oscillation suppression controller for generating a first correction information from a voltage and a current supplied to the first converter via the connected network, and
   a first correction module receiving at a first input from a first motor controller a first raw control variable representing a first operating parameter of the first electric motor and receiving at a second input from the oscillation suppression controller the first correction information, wherein the first correction module adds the first raw control variable and the first correction information by vector addition and generates therefrom the first control variable.

2. The electrical supply line of claim 1, wherein the first operating parameter comprises a space phasor.

3. The electrical supply line of claim 1, wherein the first control variable comprises a space phasor.

4. An electrical supply system comprising:
   a first electrical supply line for operating a first electric motor with a first converter for supplying electric energy to the first electric motor depending on a first control variable and a connected network connecting the first converter to a DC voltage source;
   a second electrical supply line for operating a second electric motor with a second converter for supplying electric energy to the second electric motor depending on a second control variable and a connected network connecting the second converter to a DC voltage source;
   a shared oscillation suppression controller for generating first and second correction information,
   a first correction module for generating the first control variable based on a first operating parameter of the first electric motor and on the first correction information, and
   a second correction module for generating the second control variable based on a second operating parameter of the second electric motor and on the second correction information.

5. The electrical supply system of claim 4, further comprising a shared oscillation suppression controller for generating the first and second correction information for the corresponding first and second control variables of the first and second supply lines.

6. The electrical supply system of claim 5, wherein the shared oscillation suppression controller is configured to generate the correction information for the control variable of the first supply line by taking into consideration a voltage applied to the converter of the second supply line via the connected network or by taking into consideration a current supplied to the converter of the second supply line via the connected network, or both.

7. The electrical supply system of claim 6, wherein the shared oscillation suppression controller is configured to generate the correction information for the control variable of the second supply line by taking into consideration a voltage applied to the converter of the first supply line via the connected network or by taking into consideration a current supplied to the converter of the first supply line via the connected network, or both.

8. The electrical supply system of claim 4, wherein at least one of the first and the second electric motor is part of the electrical supply system.

9. The electrical supply line of claim 1, wherein the first electric motor is part of the electrical supply line.

10. A method for operating an electric drive, comprising:
   Supplying electric energy from a DC voltage source to a first converter and a second converter via a connected network;
   Generating with a shared oscillation suppression controller first correction information by taking into consideration at least one of a voltage and a current applied to the first converter via the connected network and second correction information by taking into consideration at least one of a voltage or a current supplied to the second converter via the connected network;
   Generating a first control variable by taking into consideration an operating parameter of a first electric motor and by taking into consideration the first correction information;
   Generating a second control variable by taking into consideration an operating parameter of a second electric motor and by taking into consideration the second correction information;
   Supplying electric energy from the first converter to the first electric motor connected to the first converter in dependence of the control variable; and
   Supplying electric energy from the second converter to the second electric motor connected to the second converter in dependence of the control variable.

* * * * *